US012769344B2

(12) United States Patent
Anderson et al.

(10) Patent No.: US 12,769,344 B2
(45) Date of Patent: Oct. 20, 2026

(54) CONTROLLED FLUID DISPENSING SYSTEM WITH PROBE

(71) Applicant: Anderson Group, Ltd., Toledo, OH (US)

(72) Inventors: Nathan Anderson, Sylvania Township, OH (US); Jonathon Michael, Maumee, OH (US); Douglas Michael, Swanton, OH (US)

(73) Assignee: ANDERSON GROUP, LTD., Toledo, OH (US)

( * ) Notice: Subject to any disclaimer, the term of this patent is extended or adjusted under 35 U.S.C. 154(b) by 221 days.

(21) Appl. No.: 18/663,465

(22) Filed: May 14, 2024

(65) Prior Publication Data

US 2024/0385634 A1 Nov. 21, 2024

Related U.S. Application Data

(60) Provisional application No. 63/467,756, filed on May 19, 2023.

(51) Int. Cl.

| | |
|---|---|
| ***G05D 23/13*** | (2006.01) |
| ***A21C 1/14*** | (2006.01) |
| ***B01F 35/83*** | (2022.01) |
| ***G05D 23/19*** | (2006.01) |
| *B01F 23/70* | (2022.01) |

(52) U.S. Cl.

CPC ....... *G05D 23/1931* (2013.01); *A21C 1/1435* (2013.01); *A21C 1/1495* (2013.01); *B01F 23/711* (2022.01); *G05D 23/1393* (2013.01)

(58) Field of Classification Search

CPC ............ G05D 23/1931; G05D 23/1393; B01F 23/711; A21C 1/1435; A21C 1/1495

See application file for complete search history.

(56) References Cited

U.S. PATENT DOCUMENTS

| | | | | |
|---|---|---|---|---|
| 4,915,160 | A | 4/1990 | Reynolds | |
| 7,287,555 | B2 * | 10/2007 | Heger | F25D 23/126 141/351 |
| 7,684,446 | B2 * | 3/2010 | Mcloughlin | B01F 35/831 700/19 |
| 7,946,751 | B2 * | 5/2011 | Niermeyer | B01F 35/831 366/160.1 |
| 8,113,248 | B2 * | 2/2012 | Lee | G07F 9/10 62/390 |

(Continued)

OTHER PUBLICATIONS

International Search Report & Written Opinion in International Application No. PCT/US2024/029352 dated Jul. 17, 1 2024.

*Primary Examiner* — Frederick C Nicolas

(74) *Attorney, Agent, or Firm* — Dinsmore & Shohl LLP

(57) ABSTRACT

A fluid dispensing system includes a hot fluid control valve for controlling a flow of hot fluid through a hot fluid line, a tap fluid control valve for controlling a flow of tap fluid through a tap fluid line, a mixing line in fluid communication with the hot fluid line and the tap fluid line, one or more sensors for detecting a flow rate, a temperature, or both of fluid flowing through the mixing line, one or more probes for detecting a temperature of ambient air, a temperature of material, or both, and a controller configured to adjust the hot fluid control valve and the tap fluid control valve to achieve a target fluid temperature based on data collected by the probe.

17 Claims, 5 Drawing Sheets

(56) References Cited

U.S. PATENT DOCUMENTS

| | | | | |
|---|---|---|---|---|
| 8,245,735 | B2 * | 8/2012 | Chase | B67D 1/1238<br>141/141 |
| 8,327,889 | B2 * | 12/2012 | Ashrafzadeh | G07F 13/06<br>141/192 |
| 8,746,296 | B2 * | 6/2014 | Tobbe | F25D 29/00<br>141/351 |
| 8,935,935 | B2 * | 1/2015 | Waugh | F17D 3/00<br>62/3.63 |
| 2001/0048811 | A1 * | 12/2001 | Waithe | G05D 23/1393<br>392/475 |
| 2008/0271238 | A1 * | 11/2008 | Reeder | A61B 5/0871<br>4/597 |
| 2009/0116334 | A1 | 5/2009 | Niermeyer et al. | |
| 2015/0153744 | A1 * | 6/2015 | Didion | G05B 15/02<br>137/1 |
| 2020/0063409 | A1 * | 2/2020 | Wall | E03C 1/052 |
| 2020/0123747 | A1 * | 4/2020 | Frackelton | E03C 1/057 |
| 2021/0238832 | A1 * | 8/2021 | Schimandle | G05B 15/02 |

* cited by examiner

CONTROLLED FLUID DISPENSING SYSTEM WITH PROBE

CROSS-REFERENCE TO RELATED APPLICATION

This application claims the benefit of U.S. Provisional Patent Application No. 63/467,756, filed May 19, 2023, for "Controlled Water Dispensing System With Probe," which is hereby incorporated by reference in its entirety including the drawings.

TECHNICAL FIELD

The present specification generally relates to systems and methods for dispensing fluids to achieve a target fluid characteristics.

BACKGROUND

Fluid dispensing systems may be utilized for controlling an amount of fluid dispensed from each of a hot fluid line and a tap fluid line to result in fluid having a cumulative temperature. The fluid dispensing systems may include one or more manual or automatic valves for controlling the flow of the hot fluid and the tap fluid. However, such systems fail to take into account external factors for adjusting the valves the result in a target final temperature of the fluid and/or a final target temperature of a product formed from mixing the fluid with dry material or ingredients.

Accordingly, a need exists for improved fluid dispensing systems that take into account external factors to determine and achieve a final target fluid temperature.

SUMMARY

In some aspects as provided herein, a fluid dispensing system includes: a hot fluid control valve for controlling a flow of hot fluid through a hot fluid line; a tap fluid control valve for controlling a flow of tap fluid through a tap fluid line; a mixing line in fluid communication with the hot fluid line and the tap fluid line; a sensor detecting a temperature and flow rate of fluid flowing through the mixing line; a probe for detecting a temperature of ambient air and a temperature of material; and a controller configured to adjust the hot fluid control valve and the tap fluid control valve to achieve a target fluid temperature based on data collected by the probe.

In some aspects as provided herein, a method includes: dispensing fluid at a selected fluid start temperature; collecting, by a probe, a temperature of ambient air and a temperature of material; mixing the fluid with the material to form a final material; collecting, by the probe, a temperature of the final material after mixing; calculating a work value based on data collected by the probe; and controlling a flow of hot fluid and a flow of tap fluid by operating a hot fluid control valve and a tap fluid control valve to achieve a target fluid temperature based on data collected by the probe.

These and additional features provided by the embodiments described herein will be more fully understood in view of the following detailed description, in conjunction with the drawings.

BRIEF DESCRIPTION OF THE DRAWINGS

The exemplary depictions of some aspects as provided herein set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
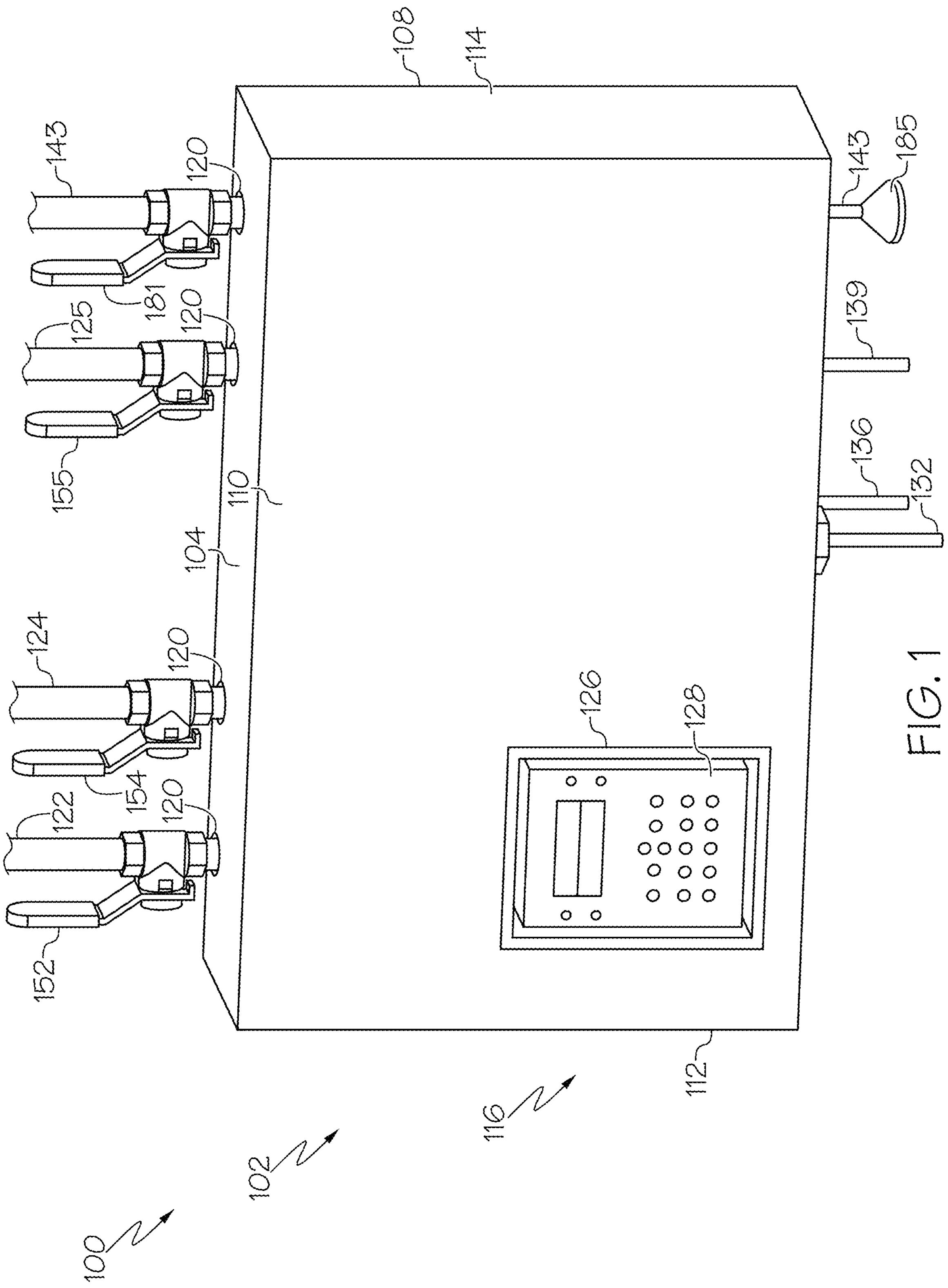
FIG. 1 schematically depicts a perspective view of a fluid dispensing system, according to one or more embodiments shown and described herein.

Provided are fluid dispensing systems and methods for providing a final target fluid temperature that results in a final target material temperature based on data collected from one or more probes such as, for example, ambient temperature and material temperature.

The fluid dispensing system includes a hot fluid control valve for controlling a flow of hot fluid through a hot fluid line, a tap fluid control valve for controlling a flow of tap fluid through a tap fluid line, a mixing line in fluid communication with the hot fluid line and the tap fluid line, a sensor detecting a temperature and flow rate of fluid flowing through the mixing line, a probe for detecting a temperature of ambient air and a temperature of material, and a controller configured to adjust the hot fluid control valve and the tap fluid control valve to achieve a target fluid temperature based on data collected by the probe. Various embodiments of the fluid dispensing system and the operation of the fluid dispensing system are described in more detail herein. Whenever possible, the same reference numerals will be used throughout the drawings to refer to the same or like parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Referring now to FIG. 1, an exemplary fluid dispensing system 100 is illustrated according to one or more embodiments described herein. The fluid dispensing system 100 may generally include a housing 102 for containing various components of the fluid dispensing system 100 and facilitating mounting the fluid dispensing system 100 to a wall surface. The housing 102 includes an upper wall 104, a lower wall 106 opposite the upper wall 104, a rear wall 108 extending between the upper wall 104 and the rear wall 108, a front wall 110 opposite the rear wall 108, a first side wall 112 extending from a side of the rear wall 108, and a second side wall 114 extending from an opposite side of the rear wall 108 and opposite the first side wall 112. The housing 102 may be formed from any suitable material such as, for example, stainless steel. In embodiments, the front wall 110, the first side wall 112, and the second side wall 114 define a cover 116 that is removable from the remaining portions of the housing 102 to expose an open interior 118 of the housing 102. Accordingly, in such embodiments in which the housing 102 includes the cover 116, the rear wall 108, the upper wall 104, and the lower wall 106 remain fixed when the cover 116 is removed.

In embodiments, the upper wall 104 includes a plurality of upper openings 120 through which a hot fluid line 122, a tap fluid line 124, and a chilled fluid line 125 extend, as described in more detail herein. Additionally, in embodiments, the front wall 110 includes a front opening 126 through which a control box 128, as described in more detail herein, is readily accessible from an exterior of the housing 102. However, it should be appreciated that, in embodiments, the control box 128 or the components associated therewith may be located exterior of the housing 102 such as, for example, on a separate computing or operating device. For example, the control box 128 or components thereof may be provided or otherwise incorporated into separate robot device that may be operated to control the other components of the fluid dispensing system 100 as discussed herein.

Figure 2:
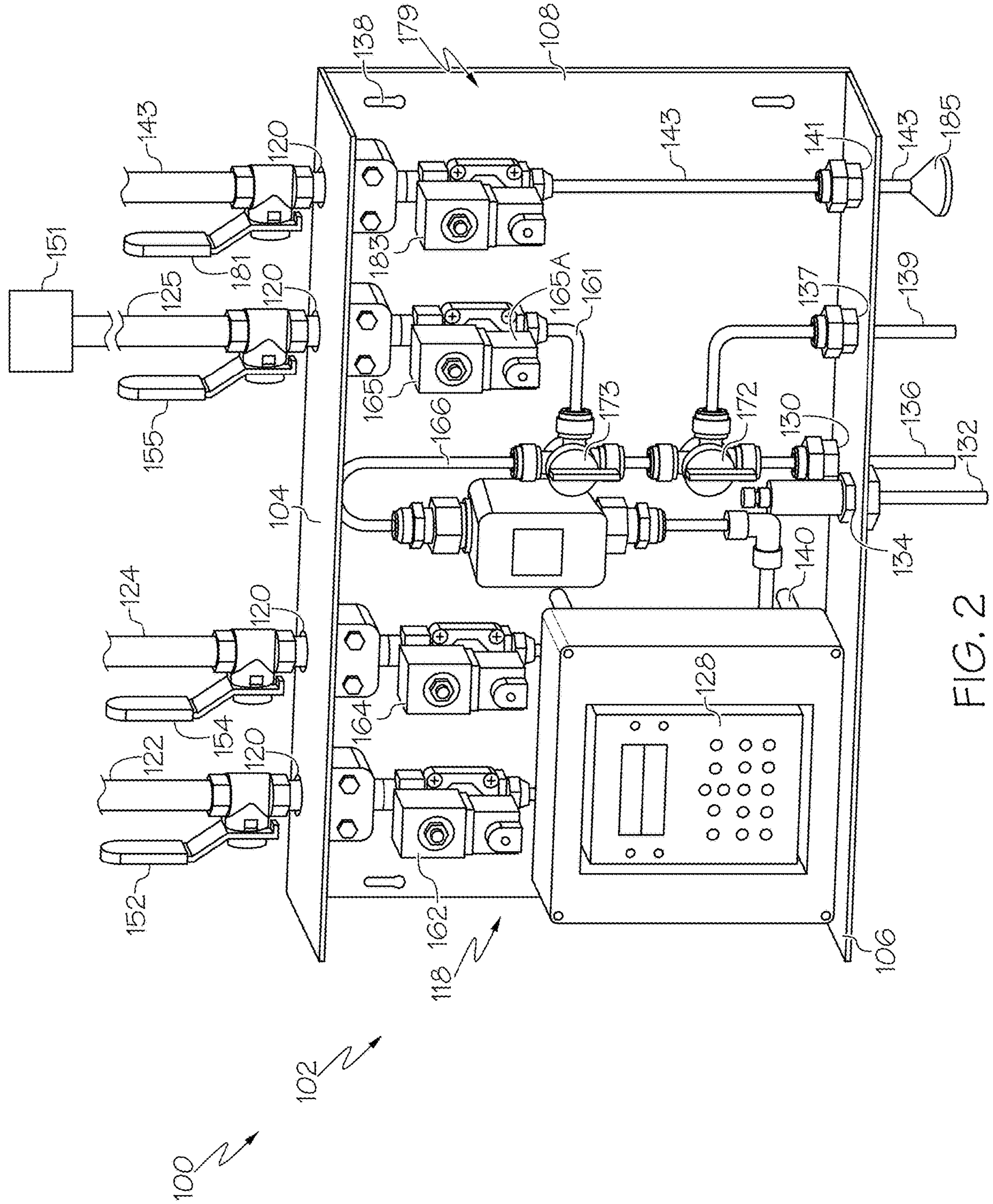
FIG. 2 schematically depicts a perspective view of the fluid dispensing system with a cover of a housing removed, according to one or more embodiments shown and described herein.

Referring now to FIG. 2, the housing 102 is shown with the cover 116 (FIG. 1) removed so as to better illustrate the components provided within the open interior 118 of the housing 102. As noted herein, the fluid dispensing system 100, particularly the housing 102, may be mounted to a wall surface in any suitable manner. For example, as shown in FIG. 2, a plurality of mounting slots 138 are formed in the rear wall 108 of the housing 102. Each mounting slot 138 is configured to receive a screw, bolt, or any other suitable fastener extending from a wall surface, not shown, and facilitate fixing a position of the housing 102 onto the wall surface.

In embodiments, the lower wall 106 includes a first lower opening 130 through which a probe 132 extends, a second lower opening 134 through which a first fluid outlet 136 extends, a third lower opening 137 through which a second fluid outlet 139 extends, and a fourth lower opening 141 through which an oil line 143 extends. The probe 132, the first fluid outlet 136, the second fluid outlet 139, and the oil line 143 are described in more detail herein.

In embodiments, the control box 128 is mounted to the rear wall 108 of the housing 102 in any suitable manner. For example, the housing 102 may include a plurality of fastener-receiving conduits 140 through which a fastener, such as a screw, bolt or the like, may be inserted into through the control box 128 to fix the control box 128 to the housing 102.

Figure 3:
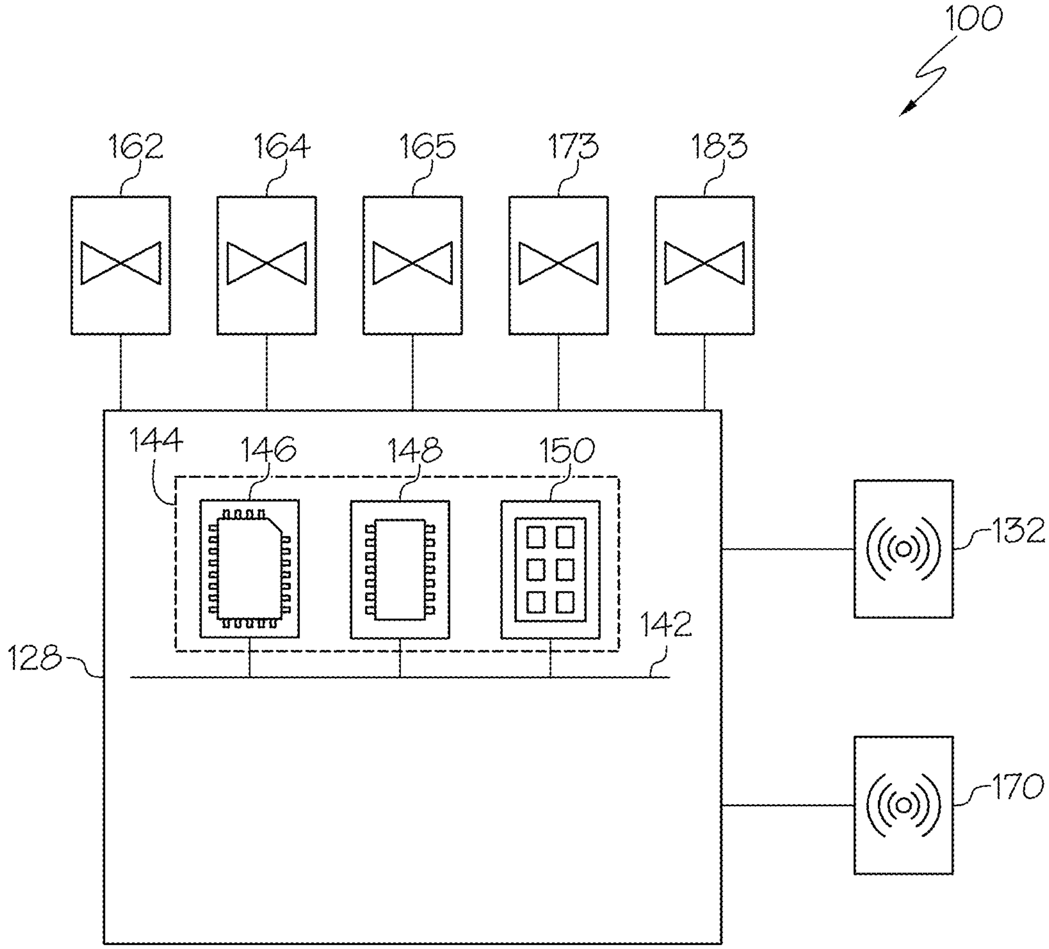
FIG. 3 schematically depicts components of the fluid dispensing system, according to one or more embodiments shown and described herein.

Referring now to FIG. 3, in embodiments, the control box 128 may include a communication path 142, a controller 144 such as, for example, an electronic control unit or programmable logic controller (PLC), having a processor 146 and a non-transitory computer readable memory 148, and an input device 150, as well as other components not described in detail herein. The components of the control box 128, as well as the other components of the fluid dispensing system 100 described herein, may be physically coupled together or may be communicatively and operably coupled through the communication path 142 and/or a network. The various components of the control box 128 and the interaction thereof will be described in detail below.

The communication path 142 may be formed from any medium that is capable of transmitting a signal such as, for example, conductive wires, conductive traces, optical waveguides, or the like. The communication path 142 may also refer to the expanse in which electromagnetic radiation and their corresponding electromagnetic waves traverses. Moreover, the communication path 142 may be formed from a combination of mediums capable of transmitting signals. In one embodiment, the communication path 142 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 142 communicatively couples the various components of the control box 128 and the fluid dispensing system 100. As used herein, the term "communicatively coupled" means that coupled components are capable of exchanging signals with one another such as, for example, electrical signals via conductive medium, electromagnetic signals via air, optical signals via optical waveguides, and the like.

Still referring to FIG. 3, the controller 144 may be any device or combination of components comprising the processor 146 and the non-transitory computer readable memory 148. The processor 146 may be any device capable of executing the machine-readable instruction set stored in the non-transitory computer readable memory 148. Accordingly, the processor 146 may be an electric controller, an integrated circuit, a microchip, a computer, or any other computing device. The processor 146 is communicatively coupled to the other components of the control box 128 by the communication path 142. Accordingly, the communication path 142 may communicatively couple any number of processors with one another, and allow the components coupled to the communication path 142 to operate in a distributed computing environment. Specifically, each of the components may operate as a node that may send and/or receive data. While the embodiment depicted in FIG. 3 includes a single processor 146, other embodiments may include more than one processor.

The non-transitory computer readable memory 148 of the control box 128 is coupled to the communication path 142 and communicatively coupled to the processor 146. The non-transitory computer readable memory 148 may comprise RAM, ROM, flash memories, hard drives, or any non-transitory memory device capable of storing machine-readable instructions such that the machine-readable instructions can be accessed and executed by the processor 146. The machine-readable instruction set may comprise logic or algorithm(s) written in any programming language of any generation (e.g., 1GL, 2GL, 3GL, 4GL, or 5GL) such as, for example, machine language that may be directly executed by the processor 146, or assembly language, object-oriented programming (OOP), scripting languages, microcode, etc., that may be compiled or assembled into machine readable instructions and stored in the non-transitory computer readable memory 148. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 3 includes a single non-transitory computer readable memory 148, other embodiments may include more than one memory module.

In some embodiments, the control box 128 may be communicatively coupled to a network. In some embodiments, the network is a personal area network that utilizes a wireless (e.g., Bluetooth) technology to communicatively couple the control box with a management server, a personal device of a user, or any other network connectable device. In other embodiments, the network may include one or more computer networks (e.g., a personal area network, a local area network, or a wide area network), cellular networks, satellite networks and/or a global positioning system and combinations thereof. Accordingly, the control box 128 can be communicatively coupled to the network via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 3, the input device 150 is coupled to the communication path 142 and communicatively coupled to the processor 146. The input device 150 may be any device capable of transforming user contact into a data signal that can be transmitted over the communication path 142 such as, for example, a button, a switch, a knob, or the like. In some embodiments, the input device 150 includes a power button, an activation button, a scroll button, or the like. The input device 150 may be provided so that the user may interact with the control box 128, such as to navigate menus, make selections, set preferences, provide inputs, and other functionality described herein. In embodiments, the control box 128 may include multiple input devices disposed on any surface of the housing 102.

Figure 4:
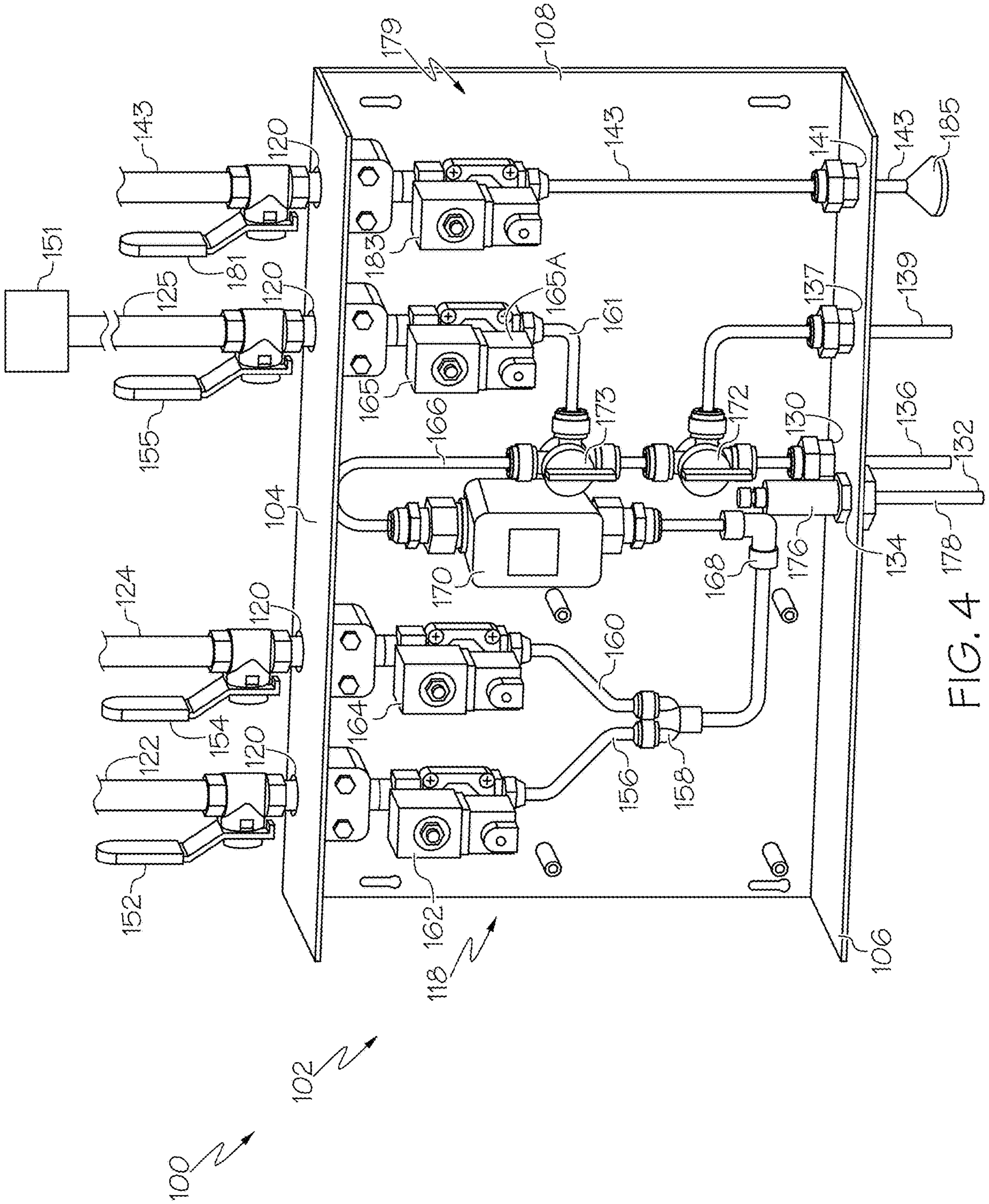
FIG. 4 schematically depicts a perspective view of the fluid dispensing system with the cover of the housing and a control box removed, according to one or more embodiments shown and described herein.

Referring now to FIG. 4, the fluid dispensing system 100 is shown with the cover 116 (FIG. 1) of the housing 102 and the control box 128 (FIG. 1) removed to better illustrate the components of the fluid dispensing system 100 provided within the open interior 118 of the housing 102. As described herein, the fluid dispensing system 100 includes the hot fluid line 122, the tap fluid line 124, and the chilled fluid line 125 that direct hot fluid, tap fluid, and chilled fluid, respectively, through the housing 102. Although not shown, it should be appreciated that the hot fluid line 122 is fluidly coupled to a hot fluid supply to receive hot fluid, the tap fluid line 124 is fluidly coupled to a tap fluid supply to receive tap fluid, and the chilled fluid line 125 is fluidly coupled to a chilled fluid supply to receive chilled fluid. It should be appreciated that reference to a "fluid" may refer any suitable liquid being dispensed by the fluid dispensing system 100 such as, for example, water, oil, such as vegetable oil or any other edible oil, and the like. Additionally, as referred to herein, "tap" refers to fluid, such as water, supplied through a tap, while "chilled" refers to fluid, such as water, that is previously chilled prior to being delivered to the housing 102. The chilled fluid may be drawn from a refrigerated or cold storage location 151 such as, for example, an external freezer. In particular, as described herein, in embodiments the fluid is water to be mixed with a dry ingredients in a collection container to be mixed to form a dough. In embodiments, the outer diameter of the hot fluid line 122, the tap fluid line 124, and the chilled fluid line 125 is ⅜ inches. However, it should be appreciated that other sizes for the hot fluid line 122, the tap fluid line 124, and the chilled fluid line 125 are contemplated.

The hot fluid line 122 includes a hot fluid shutoff valve 152 positionable between an open position and a closed position. When in the open position, hot fluid is permitted to flow from the hot fluid supply through the hot fluid line 122. When in the closed position, hot fluid from the hot fluid supply is inhibited from flowing from the hot fluid supply through the hot fluid line 122. In embodiments, the hot fluid shutoff valve 152 is manually operated. However, it should be appreciated that the hot fluid shutoff valve 152 may be automatically controlled or operated by a motor or other control device.

Similarly, the tap fluid line 124 includes a tap fluid shutoff valve 154 positionable between an open position and a closed position. When in the open position, tap fluid is permitted to flow from the tap fluid supply through the tap fluid line 124. When in the closed position, tap fluid is inhibited from flowing from the tap fluid supply through the tap fluid line 124. In embodiments, the tap fluid shutoff valve 154 is manually operated. However, it should be appreciated that the tap fluid shutoff valve 154 may be automatically controlled or operated by a motor or other control device.

Similarly, the chilled fluid line 125 includes a chilled fluid shutoff valve 155 positionable between an open position and a closed position. When in the open position, chilled fluid is permitted to flow from the chilled fluid supply through the chilled fluid line 125. When in the closed position, chilled fluid is inhibited from flowing from the chilled fluid supply through the chilled fluid line 125. In embodiments, the chilled fluid shutoff valve 155 is manually operated. However, it should be appreciated that the chilled fluid shutoff valve 155 may be automatically controlled or operated by a motor or other control device.

A hot fluid restriction line 156 extends from the hot fluid line 122 to a junction 158. Similarly, a tap fluid restriction line 160 extends from the tap fluid line 124 to the junction 158. Accordingly, the hot fluid and the tap fluid flowing through the hot fluid line 122 and the tap fluid line 124, respectively, are mixed at the junction 158. It should be appreciated that the hot fluid restriction line 156 and the tap fluid restriction line 160 have a reduced diameter relative to the hot fluid line 122 and the tap fluid line 124, respectively. In embodiments, the outer diameter of the hot fluid restriction line 156 and the tap fluid restriction line 160 is ¼ inches. However, it should be appreciated that other sizes for the hot fluid restriction line 156 and the tap fluid restriction line 160 are contemplated.

A hot fluid control valve 162 is provided at an end of the hot fluid line 122 within the housing 102 and fluidly coupled to the hot fluid line 122 to control a flow of hot fluid through the hot fluid line 122 and to the hot fluid restriction line 156. In embodiments, the hot fluid control valve 162 comprises one or more solenoid valves. However, it should be appreciated that any suitable mechanical valve may be utilized for controlling a flow of hot fluid through the hot fluid line 122 and to the hot fluid restriction line 156. The hot fluid control valve 162 is communicatively coupled to the control box 128. Accordingly, the hot fluid control valve 162 is operated to control an amount of hot fluid flowing through the hot fluid line 122 and to the hot fluid restriction line 156 based on control signals transmitted by the control box 128 and received by the hot fluid control valve 162.

Similarly, a tap fluid control valve 164 is provided at an end of the tap fluid line 124 within the housing 102 and fluidly coupled to the tap fluid line 124 to control a flow of tap fluid through the tap fluid line 124 and to the tap fluid restriction line 160. In embodiments, the tap fluid control valve 164 comprises one or more solenoid valves. However, it should be appreciated that any suitable mechanical valve may be utilized for controlling a flow of tap fluid through the tap fluid line 124 and to the tap fluid restriction line 160. The tap fluid control valve 164 is communicatively coupled to the control box 128. Accordingly, the tap fluid control valve 164 is operated to control an amount of tap fluid flowing through the tap fluid line 124 and to the tap fluid restriction line 160 based on control signals transmitted by the control box 128 and received by the tap fluid control valve 164.

Similarly, a chilled fluid control valve 165 is provided at an end of the chilled fluid line 125 within the housing 102 and fluidly coupled to the chilled fluid line 125 to control a flow of chilled fluid through the chilled fluid line 125 and to a chilled fluid restriction line 161, as described in more detail herein. In embodiments, the chilled fluid control valve 165 comprises one or more solenoid valves. However, it should be appreciated that any suitable mechanical valve may be utilized for controlling a flow of chilled fluid through the chilled fluid line 125 and to the chilled fluid restriction line 161. The chilled fluid control valve 165 is communicatively coupled to the control box 128. Accordingly, the chilled fluid control valve 165 is operated to control an amount of chilled fluid flowing through the chilled fluid line 125 and to the chilled fluid restriction line 161 based on control signals transmitted by the control box 128 and received by the chilled fluid control valve 165.

In embodiments, the chilled fluid control valve 165 includes a sensor 165A for detecting the amount of water that flows through the chilled fluid control valve 165. The sensor 165A is communicatively coupled to the controller 144. More specifically, the sensor 165A may be configured to detect the amount of water that flows in each direction through the chilled fluid control valve 165, for example, from the mixing line 166 into the chilled fluid line 125 and from the chilled fluid line 125 into the mixing line 166. This data collected by the sensor 165A is transferred to the controller 144, which processes the data to determine a net amount of fluid that is in the cold storage location 151 based on the amount of fluid flowing through the chilled fluid line 125 from the mixing line 166 less the amount of fluid flowing into the mixing line 166 from the chilled fluid line 125.

A mixing line 166 extends from the junction 158 downstream of the hot fluid restriction line 156 and the tap fluid restriction line 160. Accordingly, fluid permitted to flow through the hot fluid restriction line 156 and the tap fluid restriction line 160 by the hot fluid shutoff valve 152 and the tap fluid shutoff valve 154, respectively, flows through the mixing line 166.

It should be appreciated that, although reference is made to a single mixing line 166, it should be appreciated that the mixing line 166 may include a plurality of separate mixing line segments to accommodate for changes in direction of fluid flowing through the housing 102 given the limited space. For example, referring still to FIG. 4, an elbow 168 is provided within the open interior 118 of the housing 102 and configured to redirect the mixing line 166 from a substantially horizontal position to a substantially vertical position. In addition, it should be appreciated that discontinuities may be formed within the mixing line 166 such that the fluid flowing through the mixing line 166 may be detected or otherwise controlled by the various sensing and valve components discussed herein, as described in more detail herein.

A sensor 170 is provided within the open interior 118 of the housing 102 and the mixing line 166 passes through the sensor 170. The sensor 170 may be configured to detect a flow rate, a temperature, or both of fluid flowing through the mixing line 166. In embodiments, the sensor 170 determines a rate of fluid flowing through the sensor 170. Additionally, the sensor 170 determines a temperature of the fluid passing through the sensor 170. Specifically, as discussed herein, the mixing line 166 may have a discontinuity such that the fluid flowing through the mixing line 166 may flow directly through the sensor 170. The sensor 170 is communicatively coupled to the control box 128 such that the rate of fluid and the temperature of the fluid determined by the sensor 170 is transmitted to the control box 128 for processing, as discussed herein. The sensor 170 may be any suitable device such as, for example, a differential pressure flow sensor, a thermal flow sensor, a target flow type sensor, a turbine flow sensor, a magnetic induction flow sensor, and the like. Although only a single sensor 170 is depicted, it should be appreciated that the fluid dispensing system 100 may include a plurality of sensors 170 in fluid communication with the mixing line 166. In embodiments, one of the sensors 170 may be configured to detect a flow rate of the fluid and another of the sensors 170 may be configured to detect a temperature of the fluid.

As shown in FIG. 4, the mixing line 166 exits the sensor 170 and is redirected toward a final shutoff valve 172. As shown, the mixing line 166 has a curvature forming a U-shape proximate the upper wall 104 of the housing 102. Although not shown, one or more elbows may be provided to facilitate the change in direction of the mixing line 166.

The chilled fluid restriction line 161 is shown extending from the chilled fluid shutoff valve 155, through the chilled fluid control valve 165, to the mixing line 166. The chilled fluid restriction line 161 is fluidly coupled to the mixing line 166 by a mixing line control valve 173. In embodiments, the mixing line control valve 173 is a one-way valve that permits chilled fluid to enter the mixing line 166 from the chilled fluid restriction line 161. In other embodiments, the mixing line control valve 173 is a two-way valve that permits fluid to exit the mixing line 166 and be delivered to the cold storage location 151 via the chilled fluid restriction line 161 and the chilled fluid line 125. The mixing line control valve 173 may include any suitable valve such as, for example, a ball valve, a coaxial valve, a diaphragm valve, a butterfly valve, or the like.

The mixing line control valve 173 is operable between a first position, a second position, and a third position. When in the first position, chilled fluid is not permitted to enter the mixing line 166. When in the second position, chilled fluid is permitted to enter the mixing line 166. When in the third position, fluid flowing through the mixing line 166 is directed into the chilled fluid restriction line 161 to be delivered to the cold storage location 151. As described in more detail herein, the mixing line control valve 173 is operated between one of the above noted positions based on at least one of a temperature of the fluid detected by the sensor 170, a target temperature of the fluid, and whether fluid is required to be delivered to the first fluid outlet. In embodiments, the mixing line control valve 173 is manually operated. However, it should be appreciated that the mixing line control valve 173 may be automatically controlled or operated by a motor or other control device. For example, the mixing line control valve 173 may be communicatively coupled to the control box 128 and operated in response to receiving a signal from the control box 128. In embodiments, the chilled fluid control valve 165 may be operated between the first position, the second position, and the third position based on a particular time of day. As a non-limiting example, at a first predetermined time at which the fluid dispensing system 100 is determined to not be in use, the chilled fluid control valve 165 may be positioned into the third position to direct fluid into the cold storage location 151. As another non-limiting example, at a second predetermined time at which the fluid dispensing system 100 is determined to be use, the chilled fluid control valve 165 may be positioned into the first position or the second position to adjust a temperature of the fluid within the mixing line 166 to achieve the target temperature.

The mixing line 166 extends through the final shutoff valve 172, which is configured to control a rate of flow of fluid through the mixing line 166 at the final shutoff valve 172. As discussed herein with respect to the hot fluid shutoff valve 152 and the tap fluid shutoff valve 154, the final shutoff valve 172 is positionable between an open position, a closed position, and a purge position. When in the open position, fluid is permitted to flow through the final shutoff valve 172 and into the first fluid outlet 136. When in the closed position, fluid is inhibited from flowing through the final shutoff valve 172. When in the purge position, fluid is permitted to flow through the final shutoff valve 172 and into the second fluid outlet 139 extending from the final shutoff valve 172.

The first fluid outlet 136 is provided at an end of the mixing line 166 extending from the final shutoff valve 172 and through the first lower opening 130 formed in the lower wall 106 of the housing 102. Accordingly, the mixing line control valve 173 is located upstream of the final shutoff valve 172. It should be appreciated that, in use, a bowl, container, or other collection container is provided under the first fluid outlet 136 of the mixing line 166 such that the fluid may be collected. For example, the fluid may be collected and immediately added to other ingredients to form a dough.

The second fluid outlet 139 extends from the final shutoff valve 172 and through the third lower opening 137 formed in the lower wall 106 of the housing 102. It should be appreciated that, in use, the second fluid outlet 139 may include any suitable flexible tubing or drainage device to allow for fluid to be delivered to a remote drain.

It should be appreciated that fluid may be directed to the second fluid outlet 139 in situations in which the fluid dispensing system 100 needs to be purged of any fluid within the mixing line 166. This may occur prior to fluid being delivered to the first fluid outlet 136 and/or after use of the fluid dispensing system 100 to ensure that the temperature of fluid delivered to the first fluid outlet 136 is not affected by stagnant fluid in the mixing line 166 after passing through the sensor 170. In embodiments, the final shutoff valve 172 is manually operated. However, it should be appreciated that the final shutoff valve 172 may be automatically controlled or operated by a motor or other control device.

Referring still to FIG. 4, the probe 132 is shown partially provided within the open interior 118 of the housing 102. The probe 132 includes a mount portion 176 provided within the open interior 118 of the housing 102 and a sensing portion 178 extending from the mount portion 176 and positioned exteriorly of the housing 102. It should be appreciated that the probe 132 is communicatively coupled to the control box 128 such as by electrical wiring extending from the mount portion 176. In use, as described in more detail herein, the probe 132 may be suitable for detecting a temperature and/or a humidity of ambient air exterior of the housing 102 and a temperature of ingredients within a collection container, such as a mixing bowl. Specifically, the probe 132 may collect temperature data by raising the collection container upward such that the sensing portion 178 is inserted into the ingredients. In embodiments, the probe 132 may be capable of detecting a temperature of the collection container itself, in addition to the ingredients within the collection container. The probe 132 may include any suitable device for detecting a temperature and/or humidity of material and/or ambient air such as, for example, a thermocouple, a resistance temperature detector (RTD), a thermistor, or the like. Although only a single probe 132 is depicted, it should be appreciated that the fluid dispensing system 100 may include a plurality of probes 132. In embodiments, one of the probes 132 may be configured to detect a temperature and/or humidity of ambient air and another of the probes 132 may be configured to detect a temperature of the material.

Referring still to FIG. 4, in embodiments, the fluid dispensing system 100 includes the oil delivery system 179 including the oil line 143 extending through one of the upper openings 120 to be coupled to an oil supply, and extending through the fourth lower opening 141. The oil delivery system 179 includes an oil shutoff valve 181 located on an exterior side of the housing 102 and an oil control valve 183 located within the open interior 118 of the housing 102.

The oil shutoff valve 181 is positionable between an open position and a closed position. When in the open position, oil is permitted to flow from the oil supply through the oil line 143. When in the closed position, oil from the oil supply is inhibited from flowing from the oil supply through the oil line 143. In embodiments, the oil shutoff valve 181 is manually operated. However, it should be appreciated that the oil shutoff valve 181 may be automatically controlled or operated by a motor or other control device.

The oil control valve 183 is provided to control a flow of oil through the oil line 143. In embodiments, the oil control valve 183 comprises one or more solenoid valves. However, it should be appreciated that any suitable mechanical valve may be utilized for controlling a flow of oil through the oil line 143. The oil control valve 183 is communicatively coupled to the control box 128. Accordingly, the oil control valve 183 is operated to control an amount of oil flowing through the oil line 143 based on control signals transmitted by the control box 128 and received by the oil control valve 183.

In embodiments, the oil delivery system 179 also includes an oil nozzle 185 provided at an end of the oil line 143 proximate the fourth lower opening 141 and exterior of the housing 102. The oil nozzle 185 may be extendable from the oil line 143 such that oil exiting the oil line 143 may be delivered to a particular location by manipulating or otherwise positioning the oil nozzle 185. For example, the oil nozzle 185 may be extended from the oil line 143 and positioned relative to a pan or other baking container to apply oil onto the container prior to receiving fluid from the first fluid outlet 136. Once the oil nozzle 185 is no longer utilized, the oil nozzle may be retracted back into the oil line 143 and stored for later use.

Figure 5:
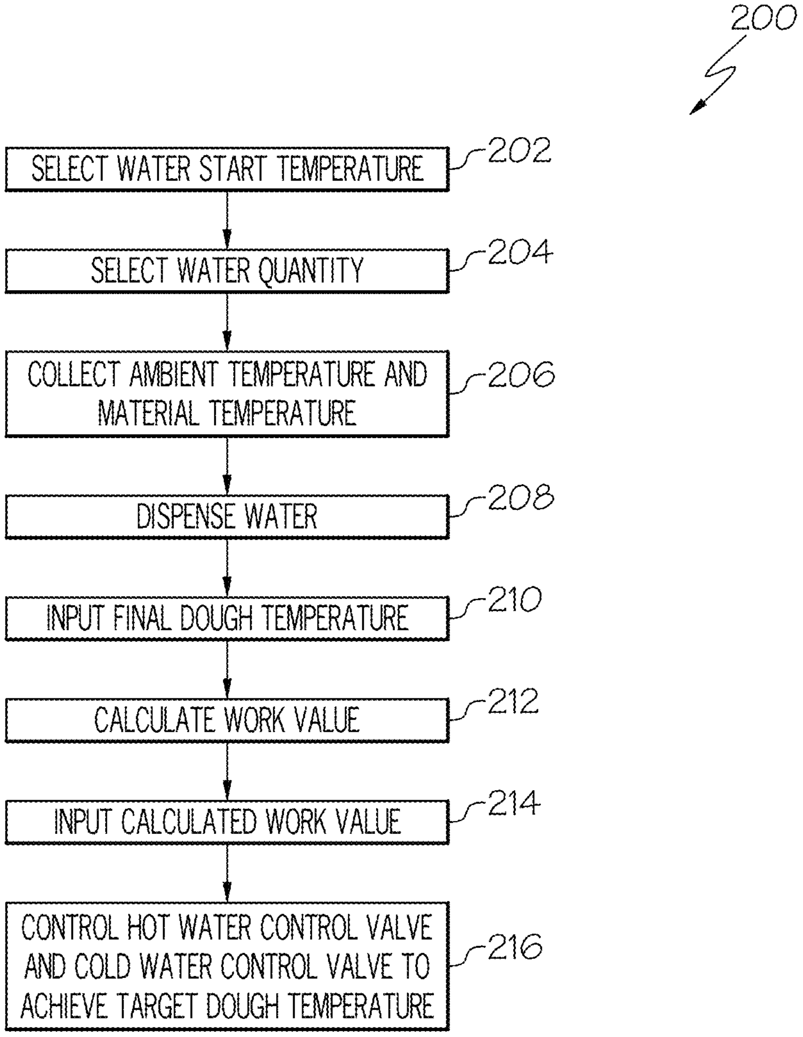
FIG. 5 depicts a flow chart of a method for operating the fluid dispensing system, according to one or more embodiments shown and described herein.

Referring now to FIG. 5, a method 200 for calibrating and using the fluid dispensing system 100 is described herein with reference to FIGS. 1-4. Initially, the method 200 begins at step 202 by manually inputting a fluid start temperature into the input device 150 of the control box 128. The fluid start temperature may be based on data provided in a lookup table including a target fluid temperature based on a particular recipe's requirements, for example, amount of dough, and any number of parameters relevant to the mixing process, for example, ambient air temperature and/or humidity, bowl temperature, and the like. Thereafter, the method 200 proceeds to step 204 at which point the fluid quantity is inputted into the input device 150 of the control box 128. Again, the fluid quantity may be based on a data provided in the lookup table including a fluid quantity for the particular recipe. In other embodiments, the fluid dispensing system 100 itself may determine the required fluid temperature and fluid quantity information based on the collected data being inputted into a known equation.

Once the fluid start temperature and fluid quantity is manually inputted into the input device 150, the probe 132 is utilized at step 206 to collect an ambient temperature and/or humidity surrounding the housing 102 as well as material temperature, such as the temperature of mixing ingredients within a collection container. As discussed herein, the collection container including the mixing ingredients may be brought into contact with the sensing portion 178 of the probe 132 such that the probe 132 may detect a temperature of the ingredients, for example, flour. In embodiments, the probe 132 may further detect a temperature of the mixing container itself. This information, including the information inputted in steps 202 and 204, are stored within the non-transitory computer readable memory 148 for purposes of calibrating the fluid dispensing system 100 for future use.

Thereafter, at step 208, fluid is dispensed into the fluid dispensing system 100. Specifically, with the hot fluid shutoff valve 152 and the tap fluid shutoff valve 154 in the open positions, hot and tap fluid enters the hot fluid line 122 and the tap fluid line 124, respectively, and the hot fluid control valve 162 and the tap fluid control valve 164 control the flow of each in accordance with the fluid start temperature provided at step 202 and the fluid quantity provided at step 204. As the fluid flows through the sensor 170, temperature and flow rate data are collected and transmitted to the control box 128, which calculates the cumulative temperature and volume of fluid exiting the fluid dispensing system 100 at the first fluid outlet 136 of the mixing line 166. In situations in which the cumulative temperature of the fluid is below the target temperature, the mixing line control valve 173 may be operated to draw chilled fluid from the cold storage location via the chilled fluid line 125.

In embodiments, prior to dispensing the fluid at step 208, a priming function may be performed such that the hot fluid line 122 and the tap fluid line 124 may be bled to remove any stagnant fluid that has collected. This prevents fluid that has either cooled or warmed to ambient or room temperature from being delivered into the collection container. As described herein, this may be performed by positioning the final shutoff valve 172 into the purge position to allow stagnant fluid to flow into the second fluid outlet 139. In embodiments, the final shutoff valve 172 or a separate valve may be operated to divert fluid from the mixing line 166 such that the fluid is not delivered into the collection container through the first fluid outlet 136. In doing so, the mixing line 166 may include a dump port operable between an open position and a closed position such that the fluid may be diverted to exit the mixing line 166 when the dump port is in the open position.

Thereafter, the fluid is then mixed with the ingredients within the collection container in accordance with a particular mix cycle of the recipe. The mix cycle may include any suitable parameters such as, for example, mixing speed, time, and the like. Once the mixing process is complete and the dough is formed, the final dough temperature is detected, such as by inserting the dough into the probe 132, and the final dough temperature is stored in the non-transitory computer readable memory 148 at step 210. In embodiments, the final dough temperature may be detected by an external sensor such as, for example, a thermometer communicatively coupled to the non-transitory computer readable memory 148. At step 212, the processor 146 calculates a work value. The work value is essentially the work imparted on the dough during the mixing cycle. At step 214, the work value is either inputted into the input device 150 manually or automatically utilized as discussed herein.

The above steps 202-214 are considered to be part of a calibration process in which a deviation between a target final dough temperature deviates from an actual final dough temperature is detected due to one or more variables such as, for example, the ambient temperature and/or humidity, the material temperature, and the like. Thus, at step 216, the work value detected at step 210 is utilized to control the hot fluid control valve 162 and the tap fluid control valve 164 to control the amount of hot fluid, the amount of tap fluid, and the amount of chilled fluid that flows through the fluid dispensing system 100 to arrive at the desired final dough temperature based on the particular recipe inputted during the calibration process and the data collected by the probe 132, e.g., ambient temperature and/or humidity and material temperature. It should be appreciated that when it is desired to perform a new recipe, including a different amount of dough and/or a different mix cycle, the calibration process should be performed to calculate the particular work value for that recipe.

From the above, it is to be appreciated that defined herein is a fluid dispensing system including a hot fluid control valve for controlling a flow of hot fluid through a hot fluid line, a tap fluid control valve for controlling a flow of tap fluid through a tap fluid line, a mixing line in fluid communication with the hot fluid line and the tap fluid line, a sensor detecting a temperature and flow rate of fluid flowing through the mixing line, a probe for detecting a temperature and/or humidity of ambient air and a temperature of material, and a controller configured to adjust the hot fluid control valve and the tap fluid control valve to achieve a target fluid temperature based on data collected by the probe.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Embodiments can be described with reference to the following clauses, with preferred features laid out in dependent clauses:

A fluid dispensing system comprising: a hot fluid control valve for controlling a flow of hot fluid through a hot fluid line; a tap fluid control valve for controlling a flow of tap fluid through a tap fluid line; a mixing line in fluid communication with the hot fluid line and the tap fluid line; one or more sensors for detecting a flow rate, a temperature, or both of fluid flowing through the mixing line; one or more probes for detecting a temperature of ambient air, a temperature of material, or both; and a controller configured to adjust the hot fluid control valve and the tap fluid control valve to achieve a target fluid temperature based on data collected by the probe.

The fluid dispensing system of any preceding clause, wherein the controller is provided in a control box, the control box further comprising a user interface.

The fluid dispensing system of any preceding clause, further comprising a housing, the hot fluid control valve, the tap fluid control valve, the sensor, and optionally the control box provided within the housing.

The fluid dispensing system of any preceding clause, wherein the housing includes a cover removable from the housing, the cover having a front opening formed therein and the user interface provided within the front opening to be accessible from an exterior of the housing.

The fluid dispensing system of any preceding clause, further comprising one or more shutoff valves, optionally a hot fluid shutoff valve and/or a tap fluid shutoff valve for controlling a flow of fluid through the hot fluid line or the tap fluid line.

The fluid dispensing system of any preceding clause, wherein the hot fluid control valve, the tap fluid control valve, or both comprises one or more solenoid valves.

The fluid dispensing system of any preceding clause, further comprising a final shutoff valve provided in the mixing line downstream of the sensor.

The fluid dispensing system of any preceding clause, wherein the controller is configured to calculate a work value based on a final material temperature detected by the probe after a mixing cycle.

The fluid dispensing system of any preceding clause, wherein the controller is configured to control the hot fluid control valve and/or the tap fluid control valve based on the calculated work value to achieve a target material temperature.

A method comprising: dispensing a fluid at a selected fluid start temperature; collecting, by one or more probes, a temperature of ambient air and a temperature of material; mixing the fluid with the material to form a final material; collecting, by the one or more probes, a temperature of the final material after mixing; calculating a work value based on data collected by the probe; and controlling a flow of hot fluid and a flow of tap fluid by operating a hot fluid control valve and/or a tap fluid control valve to achieve a target fluid temperature based on data collected by the one or more probes.

The method of any preceding clause, wherein the hot fluid flows through a hot fluid line and the tap fluid flows through a tap fluid line.

The method of any preceding clause, wherein the hot fluid line and the tap fluid line are in fluid communication with a mixing line at which the hot fluid mixes with the tap fluid.

The method of any preceding clause, further comprising detecting a flow rate of the fluid flowing through the mixing line by a sensor.

The method of any preceding clause, wherein the hot fluid line, the tap fluid line, and the mixing line are provided within a housing.

The method of any preceding clause, wherein the housing includes a cover removable from the housing, the cover having a front opening formed therein and a user interface provided within the front opening to be accessible from an exterior of the housing.

The method of any preceding clause, further comprising controlling a flow of fluid through the hot fluid line and the tap fluid line by operating a hot fluid shutoff valve and a tap fluid shutoff valve.

The method of any preceding clause, wherein the hot fluid control valve and/or the tap fluid control valve comprises one or more solenoid valves.

The method of any preceding clause, further comprising controlling a flow of fluid by operating a final shutoff valve provided in the mixing line downstream of the sensor.

The method of any preceding clause, further comprising calculating a work value based on a final material temperature detected by the probe after a mixing cycle.

The method of any preceding clause, further comprising controlling the hot fluid control valve and the tap fluid control valve based on the calculated work value to achieve a target material temperature.

A fluid dispensing system comprising: a hot fluid control valve for controlling a flow of hot fluid through a hot fluid line; a tap fluid control valve for controlling a flow of tap fluid through a tap fluid line; a mixing line in fluid communication with the hot fluid line and the tap fluid line; one or more sensors for detecting a flow rate, a temperature, or both of fluid flowing through the mixing line; a chilled fluid control valve for controlling a flow of chilled water through a chilled fluid line; and a controller configured to adjust the hot fluid control valve, the tap fluid control valve, and the chilled fluid control valve to achieve a target fluid temperature.

The fluid dispensing system of any preceding clause, further comprising a chilled fluid restriction line extending from the chilled fluid line, the chilled fluid restriction line extending from the mixing line.

The fluid dispensing system of any preceding clause, further comprising a mixing line control valve controlling a flow of fluid between the mixing line and the chilled fluid restriction line.

The fluid dispensing system of any preceding clause, wherein the mixing line control valve is a two-way valve that, when in a first position, inhibits fluid from entering the mixing line from the chilled fluid restriction line, when in a second position, permits fluid from entering the mixing line from the chilled fluid restriction line, and when in a third position, permits fluid to flow from the mixing line into the chilled fluid restriction line.

The fluid dispensing system of any preceding clause, wherein the mixing line control valve is manually operated.

The fluid dispensing system of any preceding clause, wherein the mixing line control valve is communicatively coupled to a control box and operated in response to receiving a signal from the control box.

The fluid dispensing system of any preceding clause, wherein the mixing line control valve is operated between the first position, the second position, and the third position based on at least one of a temperature of the fluid detected by the sensor, a target temperature of the fluid, and whether fluid is required to be delivered to the first fluid outlet.

The fluid dispensing system of any preceding clause, wherein the mixing line control valve is provided upstream of a final shutoff valve.

The fluid dispensing system of any preceding clause, further comprising a second fluid outlet extending from the final shutoff valve.

The fluid dispensing system of any preceding clause, wherein the final shutoff valve is positionable between an open position, a closed position, and a purge position, wherein, when in the open position, fluid is permitted to flow from the mixing line to a first fluid outlet, when in the closed position, fluid is inhibited from flowing through the final shutoff valve, and when in the purge position, fluid is permitted to flow from the mixing line into the second fluid outlet.

The fluid dispensing system of any preceding clause, further comprising oil delivery system including an oil line for delivering oil.

The fluid dispensing system of any preceding clause, wherein the oil delivery system includes an oil control valve for controlling the flow of oil through the oil line.

A fluid dispensing system substantially as shown or described herein and according to any preceding clause.

A method controlling a flow of fluid to achieve a final target material temperature substantially as shown or described herein and according to any preceding clause.

What is claimed is:

1. A fluid dispensing system comprising:

a hot fluid control valve for controlling a flow of hot fluid through a hot fluid line;

a tap fluid control valve for controlling a flow of tap fluid through a tap fluid line;

a mixing line in fluid communication with the hot fluid line and the tap fluid line;

one or more sensors for detecting a flow rate, a temperature, or both of fluid flowing through the mixing line;

one or more probes for detecting a temperature of ambient air, a temperature of material, or both;

a controller configured to adjust the hot fluid control valve and the tap fluid control valve to achieve a target fluid temperature based on data collected by the probe, the controller provided in a control box including a user interface; and a housing including a cover removable from the housing, the cover having a front opening formed therein and the user interface provided within the front opening to be accessible from an exterior of the housing, the hot fluid control valve and the tap fluid control valve provided within the housing.

2. The fluid dispensing system of claim 1, wherein the one or more sensors, and the control box are provided within the housing.

3. The fluid dispensing system of claim 1, further comprising one or more shutoff valves, a hot fluid shutoff valve and/or a tap fluid shutoff valve for controlling a flow of fluid through the hot fluid line or the tap fluid line.

4. The fluid dispensing system of claim 1, wherein the hot fluid control valve, the tap fluid control valve, or both comprises one or more solenoid valves.

5. The fluid dispensing system of claim 1, further comprising a final shutoff valve provided in the mixing line downstream of the sensor.

6. The fluid dispensing system of claim 1, wherein the controller is configured to calculate a work value based on a final material temperature detected by the probe after a mixing cycle.

7. The fluid dispensing system of claim 6, wherein the controller is configured to control the hot fluid control valve and/or the tap fluid control valve based on the calculated work value to achieve a target material temperature.

8. A method comprising:

dispensing a fluid at a selected fluid start temperature;

collecting, by one or more probes, a temperature of ambient air and a temperature of material;

mixing the fluid with the material to form a final material;

collecting, by the one or more probes, a temperature of the final material after mixing;

calculating a work value based on data collected by a probe; and controlling a flow of hot fluid and a flow of tap fluid by operating a hot fluid control valve and/or a tap fluid control valve to achieve a target fluid temperature based on data collected by the one or more probes, wherein the hot fluid control valve and the tap fluid control valve are provided within a housing, the housing including a cover removable from the housing, the cover having a front opening formed therein and a user interface provided within the front opening to be accessible from an exterior of the housing.

9. The method of claim 8, wherein the hot fluid flows through a hot fluid line and the tap fluid flows through a tap fluid line.

10. The method of claim 9, wherein the hot fluid line and the tap fluid line are in fluid communication with a mixing line at which the hot fluid mixes with the tap fluid.

11. The method of claim 10, further comprising detecting a flow rate of the fluid flowing through the mixing line by a sensor.

12. The method of claim 10, wherein the hot fluid line, the tap fluid line, and the mixing line is provided within the housing.

13. The method of claim 8, further comprising controlling a flow of fluid through the hot fluid line and the tap fluid line by operating a hot fluid shutoff valve and a tap fluid shutoff valve.

14. The method of claim 8, wherein the hot fluid control valve and/or the tap fluid control valve comprises one or more solenoid valves.

15. The method of claim 11, further comprising controlling a flow of fluid by operating a final shutoff valve provided in the mixing line downstream of the sensor.

16. The method of claim 8, further comprising calculating a work value based on a final material temperature detected by the probe after a mixing cycle.

17. The method of claim 16, further comprising controlling the hot fluid control valve and the tap fluid control valve based on the calculated work value to achieve a target material temperature.

* * * * *